United States Patent
Ahn et al.

(10) Patent No.: US 11,985,656 B2
(45) Date of Patent: May 14, 2024

(54) METHOD AND APPARATUS FOR TRANSMITTING AND RECEIVING POWER HEADROOM INFORMATION IN WIRELESS COMMUNICATION SYSTEM

(71) Applicant: LG Electronics Inc., Seoul (KR)

(72) Inventors: Joonkui Ahn, Seoul (KR); Suckchel Yang, Seoul (KR); Hanul Lee, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 414 days.

(21) Appl. No.: 17/298,350

(22) PCT Filed: Nov. 28, 2019

(86) PCT No.: PCT/KR2019/016636
§ 371 (c)(1),
(2) Date: May 28, 2021

(87) PCT Pub. No.: WO2020/111841
PCT Pub. Date: Jun. 4, 2020

(65) Prior Publication Data
US 2022/0104222 A1 Mar. 31, 2022

(30) Foreign Application Priority Data
Nov. 28, 2018 (KR) .......................... 10-2018-0150224

(51) Int. Cl.
*H04W 4/00* (2018.01)
*H04L 5/00* (2006.01)
(Continued)

(52) U.S. Cl.
CPC ....... *H04W 72/1268* (2013.01); *H04L 5/0051* (2013.01); *H04L 27/26025* (2021.01); *H04W 52/365* (2013.01); *H04W 72/23* (2023.01)

(58) Field of Classification Search
CPC .............. H04W 72/12; H04W 72/1268; H04L 27/26025
See application file for complete search history.

(56) References Cited

U.S. PATENT DOCUMENTS 10,972,987 B2 * 4/2021 Akkarakaran ........ H04W 72/23
2017/0019887 A1 * 1/2017 Jiang ..................... H04W 72/23
(Continued)

FOREIGN PATENT DOCUMENTS

KR 1020120118509 10/2012

OTHER PUBLICATIONS

International Search Report and Written Opinion in International Appln. No. PCT/KR2019/016636, dated Mar. 19, 2020, 16 pages (with English translation).
(Continued)

*Primary Examiner* — Elisabeth Benoit Magloire
(74) *Attorney, Agent, or Firm* — Fish & Richardson P.C.

(57) ABSTRACT

A wireless communication system and, more particularly, a method and an apparatus therefor, the method including the steps of: triggering power headroom reporting at a first time point; determining power headroom (PH) information of a cell on the basis of actual transmission or a reference format, on the basis of an uplink (UL) scheduling status; and transmitting the PH information of the cell at a second time point, via a configured grant based physical uplink shared channel (PUSCH), wherein the UL scheduling status includes downlink control information reception from the first time point to a third time point which exists before the second time point, and a time interval between the third time point and the second time point is determined on the basis of a PUSCH processing time.

11 Claims, 14 Drawing Sheets

| Index | n | n+1 | n+2 | n+3 | n+4 | n+5 | n+6 | n−7 | n+8 | n+9 |
|---|---|---|---|---|---|---|---|---|---|---|
| TU (e.g.,slot) | | PHR TRIGGER | | | | | Reference time | | | PUSCH (PHR) |

Based on PUSCH timing capability

PHR for an activated serving cell is based on an actual transmission or a reference format based on downlink control information the UE received during this time window

(51) Int. Cl.
  *H04L 27/26* (2006.01)
  *H04W 52/36* (2009.01)
  *H04W 72/1268* (2023.01)
  *H04W 72/23* (2023.01)

(56) References Cited

U.S. PATENT DOCUMENTS

| | | | |
|---|---|---|---|
| 2018/0261097 A1 | 9/2018 | Jiang et al. | |
| 2018/0368081 A1* | 12/2018 | Akkarakaran | H04W 52/365 |
| 2019/0239118 A1* | 8/2019 | Baghel | H04W 8/22 |
| 2019/0394732 A1* | 12/2019 | Loehr | H04L 5/001 |
| 2020/0288412 A1* | 9/2020 | Ajdakple | H04W 52/242 |

OTHER PUBLICATIONS

Lenovo, Motorola Mobility, "Determination of actual vs. virtual PHR for CA case," R2-1817500, 3GPP TSG-RAN WG2 Meeting #104, Spokane, USA, dated Nov. 12-16, 2018, 6 pages.
Nokia et al., "PHR timing," R2-1817494, 3GPP TSG-RAN WG2 Meeting #104, Spokane, USA, dated Nov. 12-16, 2018, 5 pages.
Nokia, "Clarification on PHR timing for configured grant," R2-1818803, 3GPP TSG-RAN WG2 Meeting #104, Spokane, USA, dated Nov. 12-16, 2018, 7 pages.

* cited by examiner (a) Uplink Tx procedure based on dynamic grant
(b) Uplink Tx procedure based on configured grant

FIG. 9

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, SpCell of the other MAC entity)} |
| R | R | \multicolumn{6}{c}{$P_{CMAX,f,c}$ 1} |
| P | V | \multicolumn{6}{c}{PH (Type 1, PCell)} |
| R | R | \multicolumn{6}{c}{$P_{CMAX,f,c}$ 2} |
| P | V | \multicolumn{6}{c}{PH (Type X, Serving Cell 1)} |
| R | R | \multicolumn{6}{c}{$P_{CMAX,f,c}$ 3} |

...

| P | V | PH (Type X, Serving Cell n) |
|---|---|---|
| R | R | $P_{CMAX,f,c}$ m |

METHOD AND APPARATUS FOR TRANSMITTING AND RECEIVING POWER HEADROOM INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2019/016636, filed on Nov. 28, 2019, which claims the benefit of Korean Application No. 10-2018-0150224, filed on Nov. 28, 2018. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An aspect of the present disclosure is to provide a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of transmitting a signal by an apparatus in a wireless communication system includes triggering a power headroom report (PHR) at a first time point, determining power headroom (PH) information about a cell based on an actual transmission or a reference format based on an uplink (UL) scheduling state, and transmitting the PH information about the cell on a configured grant (CG)-based physical uplink shared channel (PUSCH) at a second time point. The UL scheduling state includes reception of downlink control information (DCI) from the first time point to a third time point before the second time point, and a time interval between the third time point and the second time point is determined based on a PUSCH processing time.

According to an aspect of the present disclosure, an apparatus used in a wireless communication system includes a memory and a processor. The processor is configured to trigger a PHR at a first time point, determine PH information about a cell based on an actual transmission or a reference format based on a UL scheduling state, and transmit the PH information about the cell on a CG-based PUSCH at a second time point. The UL scheduling state includes reception of DCI from the first time point to a third time point before the second time point, and a time interval between the third time point and the second time point is determined based on a PUSCH processing time.

The PUSCH processing time may satisfy $A*2^{-u}$ where A may be a positive number based on a PUSCH timing capability and u may be one of (uDL, uUL), which maximizes the PUSCH processing time. uDL may be related to a subcarrier spacing (SCS) of a scheduling cell for the CG-based PUSCH, uUL may be related to an SCS applied to the CG-based PUSCH, and the SCSs may satisfy $15*2^u$ KHz.

uDL may be related to an SCS of an active downlink (DL) bandwidth part (BWP) of the scheduling cell.

$A*2^{-u}$ may satisfy $(N_2+d_{2,1})(2048+144)*k*2^{-u}*Tc$, N2 may represent the number of symbols based on the PUSCH timing capability, $d_{2,1}$ may be 0 or 1, k may be 64, and Tc may be $1/(480*103*4096)$.

The cell may be an activated cell.

The cell may be different from a cell in which the CG-based PUSCH is transmitted.

The UL scheduling state may further include a sound reference signal (SRS) scheduling state.

The apparatus may include an autonomous driving vehicle communicable with at least a user equipment (UE), a network, and another autonomous driving vehicle other than the apparatus.

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 9 illustrates an exemplary PHR medium access control (MAC) control element (CE);

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as universal terrestrial radio access (UTRA) or CDMA2000. TDMA can be implemented as a radio technology such as global system for mobile communications (GSM)/general packet radio service (GPRS)/enhanced data rates for GSM evolution (EDGE). OFDMA can be implemented as a radio technology such as institute of electrical and electronics engineers (IEEE) 802.11 (Wireless Fidelity (Wi-Fi)), IEEE 802.16 (worldwide interoperability for microwave access (WiMAX)), IEEE 802.20, and evolved UTRA (E-UTRA). UTRA is a part of universal mobile telecommunications system (UMTS). 3rd generation partnership project (3GPP) long term evolution (LTE) is part of evolved UMTS (E-UMTS) using E-UTRA, and LTE-advanced (A) is an evolved version of 3GPP LTE. 3GPP NR (new radio or new radio access technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
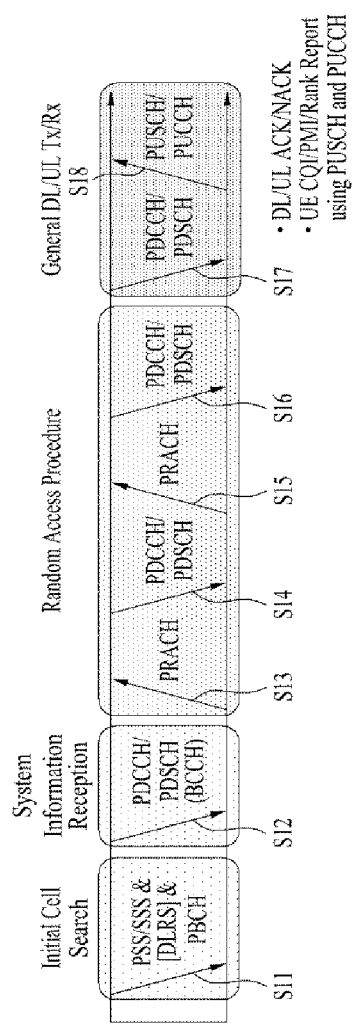
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
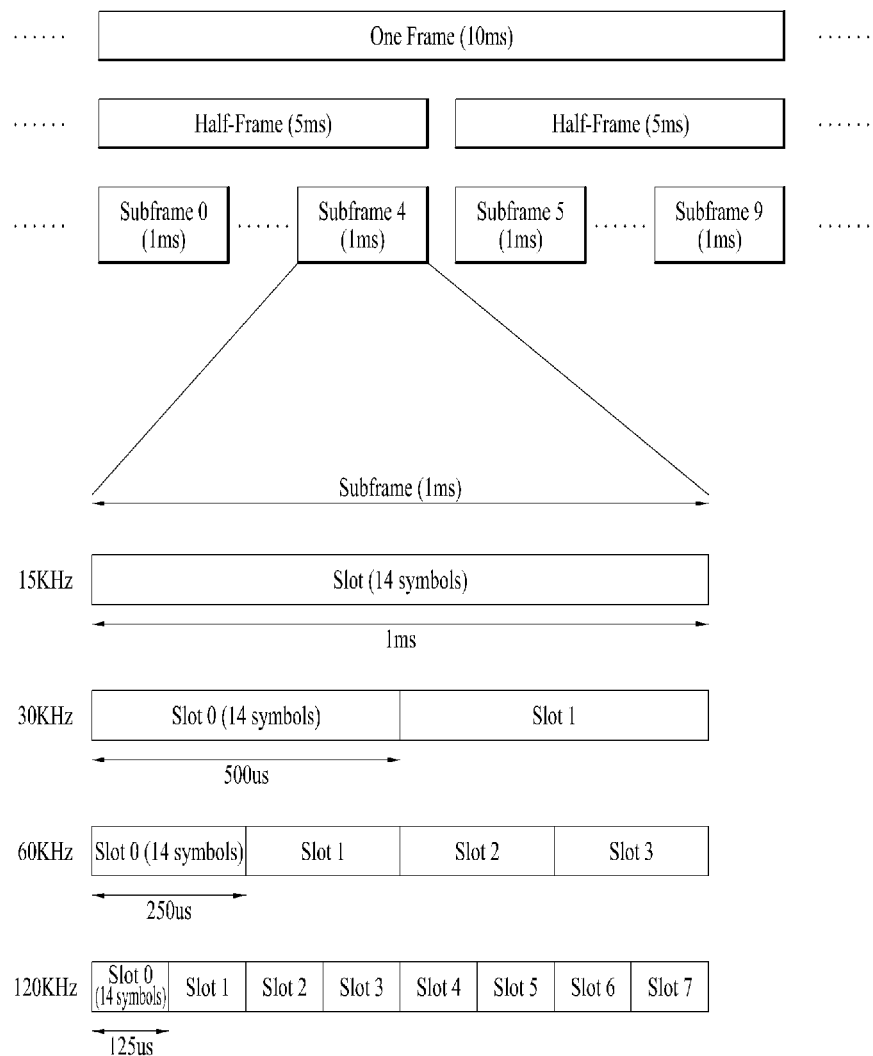
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |

TABLE 1-continued

| SCS (15 * 2^u) | $N^{slot}_{symb}$ | $N^{frame,u}_{slot}$ | $N^{subframe,u}_{slot}$ |
|---|---|---|---|
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

NR supports multiple numerologies (e.g., subcarrier spacings (SCSs)) to support various 5th generation (5G) services. For example, the NR system supports a wide area in conventional cellular bands for an SCS of 15 kHz, a dense urban environment, low latency, and a wide carrier bandwidth for an SCS of 30/60 kHz, and a bandwidth wider than 24.25 GHz to overcome phase noise, for an SCS of 60 kHz or above.

An NR frequency band is defined by two types of frequency ranges, FR1 and FR2. FR1 and FR2 may be configured as described in Table 3 below. FR2 may represent millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
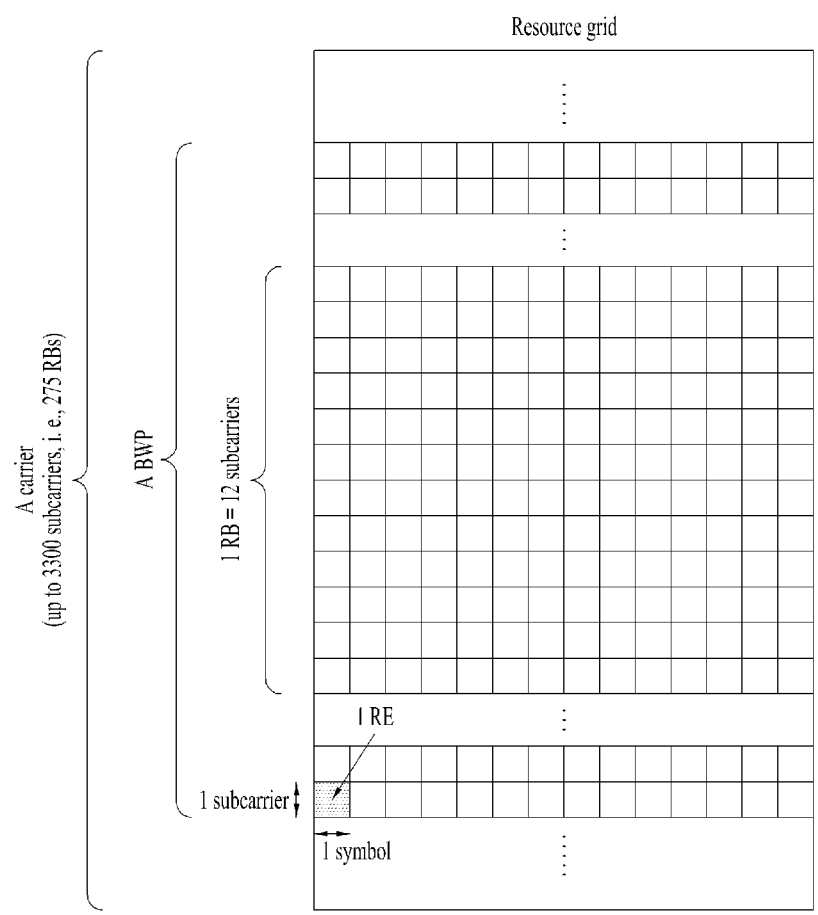
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
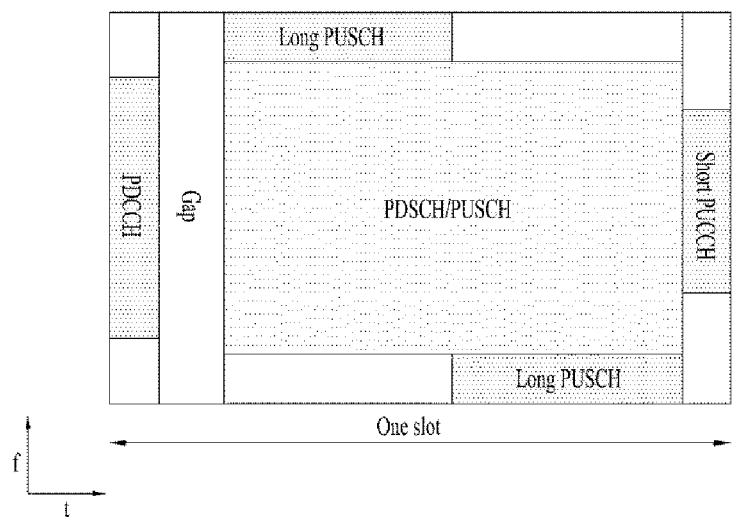
FIG. 4 illustrates an example in which physical channels are multiplexed in a slot.

FIG. 4 illustrates exemplary multiplexing of physical channels in a slot. In the NR system, a slot has a self-contained structure in which all of a DL control channel, a DL/UL data, and a UL control channel are included. A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a slot may be configured as the GP.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

Table 4 exemplarily shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling of a TB-based (or TB-level) PUSCH, and DCI format 0_1 may be used for scheduling of a TB-based (or TB-level) PUSCH or a Code Block Group (CBG)-based (or CBG-level) PUSCH. DCI format 1_0 may be used for scheduling of a TB-based (or TB-level) PDSCH, and DCI format 1_1 may be used for scheduling of a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used to deliver dynamic slot format information (e.g., dynamic SFI) to the UE, and DCI format 2_1 is used to deliver downlink pre-emption information to the UE. DCI format 2_0 and/or DCI format 2_1 may be delivered to UEs in a group on a group common PDCCH, which is a PDCCH delivered to UEs defined as one group.

The PDSCH carries downlink data (e.g., DL-SCH transport block (DL-SCH TB)), and a modulation technique such as quadrature phase shift keying (QPSK), 16 quadrature amplitude modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a demodulation reference signal (DMRS) to generate an OFDM symbol signal and transmit the signal through a corresponding antenna port.

The PUCCH carries uplink control information (UCI). The UCI includes the following information.
  Scheduling request (SR): Information that is used to request a UL-SCH resource.
  Hybrid automatic repeat request (HARQ)-acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.
  Channel state information (CSI): Feedback information about a downlink channel. Multiple input multiple output (MIMO)-related feedback information includes a rank indicator (RI) and a precoding matrix indicator (PMI).

The PUSCH carries uplink data (e.g., UL-SCH transport block (UL-SCH TB)) and/or uplink control information (UCI), and is transmitted based on a cyclic prefix-orthogonal frequency division multiplexing (CP-OFDM) waveform or a discrete Fourier transform-spread-orthogonal frequency division multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 5:
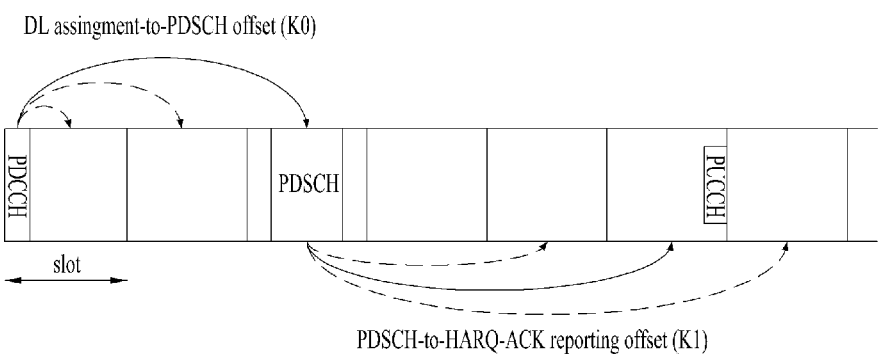
FIG. 5 illustrates an acknowledgement/negative acknowledgement (ACK/NACK) transmission procedure.

FIG. 5 illustrates an ACK/NACK transmission procedure. Referring to FIG. 5, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.
  Frequency domain resource assignment: indicates an RB set assigned to the PDSCH.
  Time domain resource assignment: indicates K0 and the starting position (e.g. OFDM symbol index) and duration (e.g. the number of OFDM symbols) of the PDSCH in a slot.
  PDSCH-to-HARQ feedback timing indicator: indicates K1.
  HARQ process number (4 bits): indicates HARQ process ID(Identity) for data (e.g. PDSCH, TB)

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Figure 6:
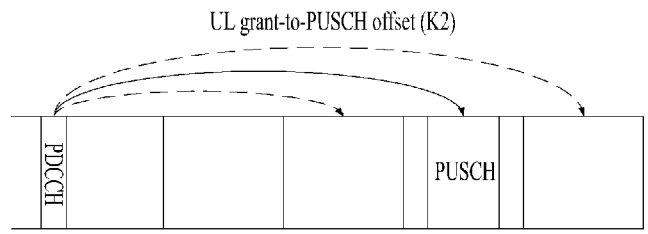
FIG. 6 illustrates an exemplary physical uplink shared channel (PUSCH) transmission procedure.

FIG. 6 illustrates an exemplary PUSCH transmission procedure. Referring to FIG. 6, a UE may detect a PDCCH in slot #n. The PDCCH may include UL scheduling information (e.g., DCI format 0_0, DCI format 0_1). DCI format 0_0 and DCI format 0_1 may include the following information.
  Frequency domain resource assignment: this indicates an RB set allocated to a PUSCH.
  Time domain resource assignment: this specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

In the 3GPP 5G NR system, a minimum time interval (hereinafter, referred to as a PUSCH processing time) between the ending time (e.g., symbol) of PUSCH transmission scheduling for the UE by DCI from the BS and the starting time (e.g., symbol) of the PUSCH transmission is defined as follows according to the PUSCH timing capability of the UE. The PUSCH processing time is determined in association with the SCS μDL of a DL BWP in which the DCI has been transmitted and the SCS μDL of a UL BWP in which the PUSCH will be transmitted.

$$T_{proc,2} = \max((N_2 + d_{2,1})(2048+144)*k*2^{-u}*T_c, d_{2,2}) \quad \text{[Equation 1]}$$

In [Equation 1], max( ) represents a maximum value function, and the parameters are defined as follows.
  $N_2$: represents the number of symbols corresponding to a PUSCH preparation time. $N_2$ is defined based on u (see Tables 5 and 6). u is one of (uDL and uUL), which maximizes $T_{proc,2}$. uDL is the SCS of the DL (BW) carrying the DCI that schedules the PUSCH, and uUL is the SCS of the UL (BWP) (or UL channel) to carry the PUSCH.
  $d_{2,1}$: has a value of 0 or 1. For example, when the first symbol of the PUSCH allocation includes only a DMRS, $d_{2,1}=0$ and else, $d_{2,1}=1$.

k: $T_s/T_c=64$. $T_s=1/(\Delta f_{ref}*N_{f,ref})$ where $\Delta f_{ref}=15*10^3$ Hz and $N_{f,ref}=2048$.

$T_c$: $1/(\Delta f_{max}*N_f)$ where $\Delta f_{max}=480*10^3$ Hz and $N_f=4096$.

$d_{2,2}$: represents the lower bound of $T_{proc,2}$. When DCI triggers BWP switching, $d_{2,2}$ represents a switching-related time and else, $d_{2,2}=0$.

TABLE 5

| u (SCS = 15 * $2^u$) | PUSCH preparation time N2 [symbols] for PUSCH timing capability 1 |
|---|---|
| 0 (15 KHz) | 10 |
| 1 (30 KHz) | 12 |
| 2 (60 KHz) | 23 |
| 3 (120 KHz) | 36 |

TABLE 6

| u (SCS = 15 * $2^u$) | PUSCH preparation time N2 [symbols] for PUSCH timing capability 2 |
|---|---|
| 0 (15 KHz) | 5 |
| 1 (30 KHz) | 5.5 |
| 2 (60 KHz) | 11 for frequency range 1 |

Figure 7:
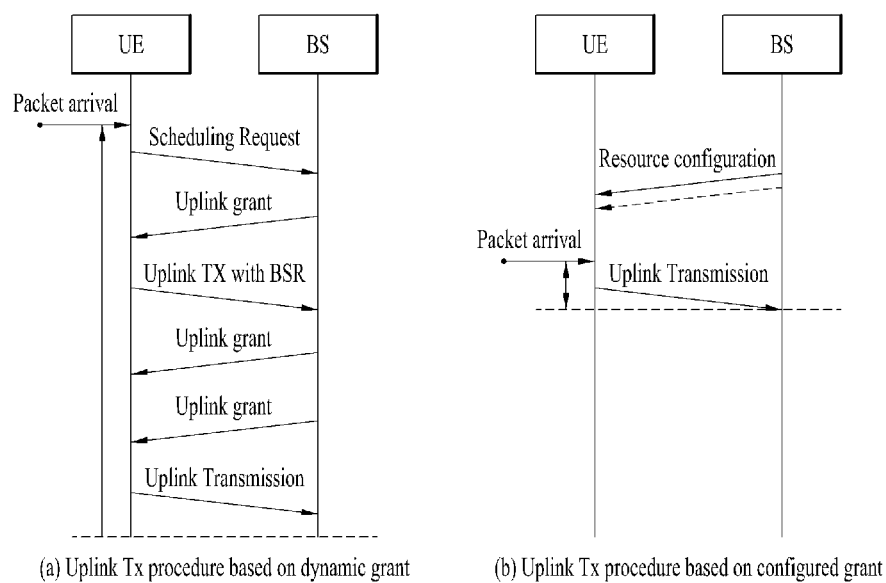
FIG. 7 illustrates exemplary uplink transmission processes.

FIG. 7 illustrates exemplary UL transmissions. The UE may transmit a data packet based on a dynamic grant (FIG. 7(a)) or based on a configured grant (CG) (FIG. 7(b)). In FIG. 7(a), the BS dynamically allocates UL transmission resources (e.g., PUSCH resources) to the UE at each UL transmission by a PDCCH (including DCI format 0_0 or DCI format 0_1). In contrast, in FIG. 7(b), the BS preallocates UL transmission resources (e.g., PUSCH resources) to the UE by higher-layer signaling (e.g., RRC signaling), without transmitting DCI for a UL transmission.

Two types are defined for the CG.

Type 1: A UL grant is periodically configured by higher-layer signaling (e.g., RRC signaling), and a CG-based UL transmission may be performed without additional Layer 1 (L1) signaling.

Type 2: The periodicity of a UL grant is configured by higher-layer signaling (e.g., RRC signaling), and CG activation/deactivation is indicated by L1 signaling (e.g., a PDCCH).

In carrier aggregation (CA), a plurality of component carriers (CCs) may be aggregated. A UE may receive or transmit a signal simultaneously in one or more CCs based on the capabilities of the UE. Up to 16 DL CCs and up to 16 UL CCs may be configured for one UE. A cell may include one DL CC and zero to two UL CCs. Linkage between the DL CC and the UL CCs in the cell may be determined based on a system information block (SIB)-2. Among a plurality of cells, a primary cell (PCell) is configured for a special operation such as system information transmission, initial access attempt, and UCI transmission. The PCell includes a DL primary CC (PCC) and a UL PCC corresponding to the DL PCC. A cell other than the PCell includes a secondary cell (SCell). The PCell may be always activated, whereas the SCell may be activated/deactivated according to an indication from a BS. When dual connectivity (DC) is supported, a master cell group (MCG) and a secondary cell group (SCG) are configured. The MCG includes a PCell and zero or more SCells, and the SCG includes a primary SCG Cell (PSCell) and zero or more SCells.

In a CA situation, non-cross carrier scheduling mode and cross carrier scheduling mode are available for scheduling. In non-cross carrier scheduling, a DL/UL grant transmitted in a PDCCH region of a DL CC in a cell may schedule only a PDSCH/PUSCH of the cell to which the DL CC belongs. That is, a PDCCH search space in which detection of a DL/UL grant is attempted exists in the PDCCH region of a cell in which a PDSCH/PUSCH to be scheduled exists. In cross carrier scheduling, a scheduling cell (or CC) is configured, and a DL/UL grant transmitted in a PDCCH region of the scheduling cell schedules a PDSCH/PUSCH of a cell (i.e., a scheduled cell) configured to be scheduled by the scheduling cell. That is, a PDCCH search space for a plurality of CCs exists in the PDCCH region of the scheduling cell. The DL/UL grant of the scheduling cell includes a carrier indicator field (CIF), and the CIF includes cell index information about the scheduled cell.

Figure 8:
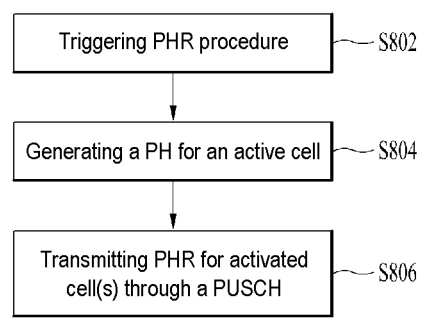
FIG. 8 is an exemplary flowchart illustrating a power headroom report (PHR) procedure.

FIG. 8 illustrates an exemplary power headroom reporting/report (PHR) procedure. The PHR procedure is used to indicate the amount of the remaining transmission power except for current transmission power at a UE to a BS. The BS may control a UL resource allocation amount for the UE or control the transmission power/resource allocation of the UE based on the PHR.

Referring to FIG. 8, a UE may trigger the PHR procedure (S802). The PHR procedure may be triggered based on various events. For example, the PHR procedure may be triggered based on the following events: (1) phr-Prohibit-Timer expiration, and when UL resources are allocated for a new transmission after the latest PHR transmission, a pathloss variation larger than a reference value in at least one activated serving cell; (2) phr-PeriodicTimer expiration; (3) configuration/reconfiguration of a PHR function by a higher layer (e.g., RRC); (4) activation of an SCell in a medium access control (MAC) entity configured with a CG; and (5) addition of a PSCell. Subsequently, the UE may determine/calculate the PH of each activated (serving) cell (S804) and transmit a PHR for the activated cell(s) on a PUSCH (S806).

Specifically, the UE may provide the following information to the BS.

Type 1 PH: the difference between the nominal UE maximum transmit power and the estimated power for UL-SCH transmission per activated Serving Cell Type 2 PH: the difference between the nominal UE maximum transmit power and the estimated power for UL-SCH and PUCCH transmission on SpCell of the other MAC entity (i.e. E-UTRA MAC entity in EN-DC case only)

Type 3 PH: the difference between the nominal UE maximum transmit power and the estimated power for SRS transmission per activated Serving Cell FIG. 9 illustrates a multiple entry PHR MAC control element (CE). The PH of an activated (serving) cell may be transmitted in a PHR MAC CE.

Referring to FIG. 9, the PHR MAC CE has a variable size and may include (1) a bitmap, (2) a Type 2 PH field/$P_{CMAX,f,c}$ field (if reported) for a special cell (SpCell) of another MAC entity, and (3) a Type 1 PH field/$P_{CMAC,f,c}$ field for a PCell (if reported). The presence of the Type 2 PH field may be configured by a higher layer (e.g., RRC). The PHR MAC CE may include one or more Type X PH fields/$P_{CMAX,f,c}$ fields for an activated SCell (if reported). X is either 1 or 3. PH fields for activated SCells are included in an ascending order of serving cell indexes, ServCellIndex.

Each field is defined as follows:

$C_i$: This field indicates the presence of a PH field for a serving Cell with ServCellIndex i. The $C_i$ field set to "0" indicates that a PH field for the serving Cell with ServCellIndex i is not reported. When the highest of the serving cell indexes of serving cells configured with UL is less than 8, a 1-octet bitmap is used, whereas when the highest serving cell index is 8 or larger, a 4-octet bitmap is used;

R: Reserved bit set to "0";

V: This field indicates whether the PH value is based on an actual transmission or a reference format. The reference format refers to a virtual transmission/format predefined for PH calculation under the assumption that there is no actual transmission. For Type 1 PH, V=0 indicates an actual transmission on a PUSCH, and V=1 indicates that a PUSCH reference format is used. For Type 2 PH, V=0 indicates an actual transmission on a PUCCH, and V=1 indicates that a PUCCH reference format is used. For Type 3 PH, V=0 indicates an actual transmission on an SRS and V=1 indicates that an SRS reference format is used. Furthermore, for Type 1, Type 2, and Type 3 PH, V=0 indicates the presence of an associated $P_{CMAX,f,c}$ field, and V=1 indicates the absence of the associated $P_{CMAX,f,c}$ field;

PH: This field indicates a PH level;

P: This field indicates whether power backoff is applied;

$P_{CMAX,f,c}$: This field indicates $P_{CMAX,f,c}$ used for calculation of the preceding PH field. $P_{CMAX,f,c}$ represents nominal UE maximum transmission power of carrier fin serving cell c.

Embodiment: Power Headroom Report (PHR)

As described before with reference to FIG. 9, the PH of an activated (serving) cell may be determined based on an actual transmission or a reference format. For this purpose, the 3GPP 5G NR standard defines a criterion based on which when a UE reports a PH on a PUSCH in a slot/symbol (e.g., a PUSCH transmission occasion), it is determined whether to report a PH based on an actual transmission in consideration of an actually scheduled PUSCH or SRS for another activated serving cell of the slot/symbol or a PH based on a reference format on the assumption that there is no actual transmission, as follows. For details, refer to 3GPP TS 38.213 V15.3.0 (2018-09), "7.7 Power headroom report".

TABLE 7

A UE determines whether a power headroom report for an activated serving cell is based on an actual transmission or a reference format based on the downlink control information the UE received until and including the PDCCH monitoring occasion where the UE detects the first DCI format 0_0 or DCI format 0_1 scheduling an initial transmission of a transport block (=UL grant DCI that schedules a PUSCH used for carrying PHR) since a power headroom report was triggered.

Therefore, the PH of each cell may be determined based on an actual transmission or a reference format/transmission in consideration of the UL scheduling state (e.g., PUSCH or SRS) of the cell. Considering the UL scheduling state includes determining a PH based on whether there is an actual scheduled PUSCH, PUCCH or SRS in the cell, preferably whether there is an actual scheduled PUSCH, PUCCH or SRS for the slot/symbol in which the PHR PUSCH is to be transmitted. The UL scheduling state may be determined based on DCI received within a predetermined time window as described in Table 7. The PHR PUSCH refers to a PUSCH on which a PH is reported.

Figure 10:
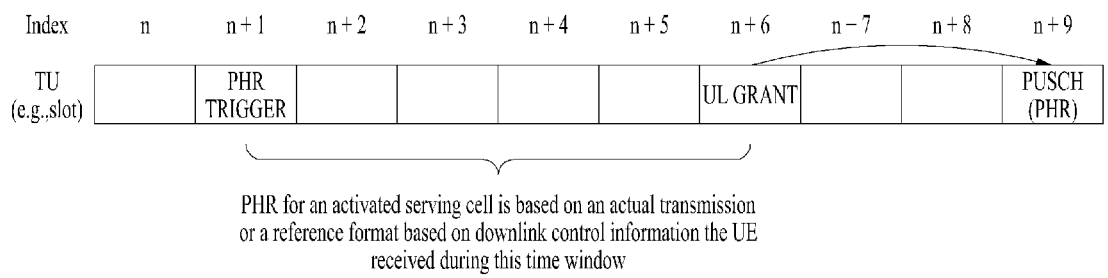
FIGS. 10 and 11 illustrate a conventional PHR procedure and a problem encountered with the conventional PHR procedure.

FIG. 10 illustrates a conventional PHR procedure. For convenience, a time period from a PHR triggered time to a reception time of DCI triggering a PUSCH on which a PHR is to be transmitted is referred to as a PHR window. For example, in FIG. 10, the PHR window may be defined as [slot #(n+1), PDCCH monitoring occasion of slot #(n+6)]. [A, B] represents the closed interval of A to B. The UE may determine/report an actual transmission-based PH for a corresponding slot/symbol (e.g., a PHR PUSCH transmission occasion) based on scheduling information (e.g., DCI) received within the PHR window (for other activated serving cells). When DCI that schedules the corresponding slot/symbol (e.g., the PHR PUSCH transmission occasion) has not been received within the PHR window (for other activated serving cells), the UE may determine/report a PH based on a reference format. Therefore, even though DCI is received within the PHR window, when the DCI does not schedule the corresponding slot/symbol (e.g., PHR PUSCH transmission occasion), the UE may determine/report a PH based on the reference format. The DCI may include scheduling information related to a UL transmission (e.g., PUSCH or SPS).

For example, the UE may determine a Type 1 PH for PUSCH transmission occasion i in active UL BWP b of carrier fin serving cell c, as follows.

$$PH_{type1} = Pmax - P\_pusch \text{ (when based on an actual transmission)}$$

$$PH_{type1} = Pmax' - P\_pusch' \text{ (when based on a reference format)} \quad \text{[Equation 2]}$$

Herein, Pmax represents a UE maximum transmission power value of carrier f in serving cell c in which a PUSCH transmission is performed. When there is one UL carrier in serving cell c, f may be omitted. P_pusch represents a power value based on actual PUSCH transmission power. A power compensation value based on pathloss may be reflected in P_pusch. Pmax' represents a UE maximum transmission power value for the reference format (or reference/virtual PUSCH transmission), and P_pusch' represents a PUSCH transmission power value for the reference format (or reference/virtual PUSCH transmission).

Similarly, for PUSCH transmission occasion i in active UL BWP b of carrier f in serving cell c, the UE may determine a Type 3 PH as follows.

$$PH_{type3} = Pmax - P\_srs \text{ (when based on an actual transmission)}$$

$$PH_{type3} = Pmax' - P\_srs' \text{ (when based on a reference format)} \quad \text{[Equation 3]}$$

Pmax represents a UE maximum transmission power value of carrier fin serving cell c in which an SRS transmission is performed. When there is one UL carrier in serving cell c, f may be omitted. P_srs represents a power value based on actual SRS transmission power. A power compensation value based on pathloss may be reflected in P_srs. Pmax' represents a UE maximum transmission power value for the reference format (or reference/virtual SRS transmission), and P_srs' represents an SRS transmission power value for the reference format (or reference/virtual SRS transmission).

For more details, refer to 3GPP TS 38.213 V15.3.0 (2018-09), "7.7 Power headroom report"; "7.7.1 Type 1 PH report"; "7.7.3 Type 3 PH report".

Figure 11:
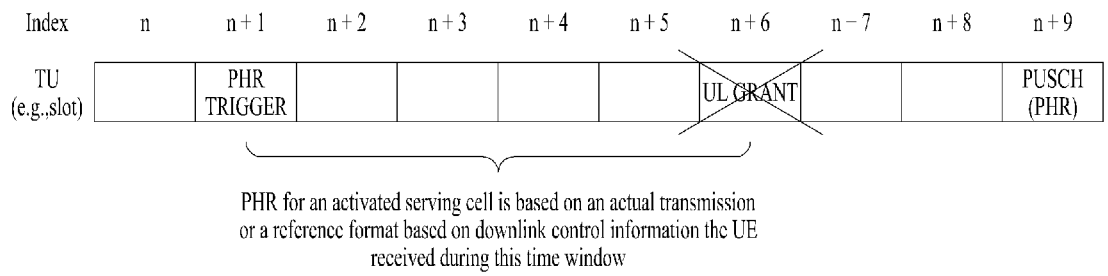

The PHR operation illustrated in FIG. 10 is valid only when a PUSCH to carry a PHR is scheduled by DCI. In the case of a PUSCH transmission performed in a semi-persist manner without DCI, such as a PUSCH transmitted through a CG, there is no DCI corresponding to each PUSCH transmission, and thus whether to report an actual transmission-based PH or a reference format-based PH becomes ambiguous for the UE. FIG. 11 illustrates a problem encountered with a PHR on a CG-based PUSCH. Referring to FIG. 11, since DCI is not transmitted for a PHR PUSCH, the ending time of the PHR window becomes obscure.

To solve the above problem, when a PUSCH to carry a PHR is not scheduled by DCI (e.g., a CG-based PUSCH), the UE may determine whether to report an actual transmission-based PH or a reference format-based PH according to a PUSCH timing capability in the present disclosure.

Figure 12:
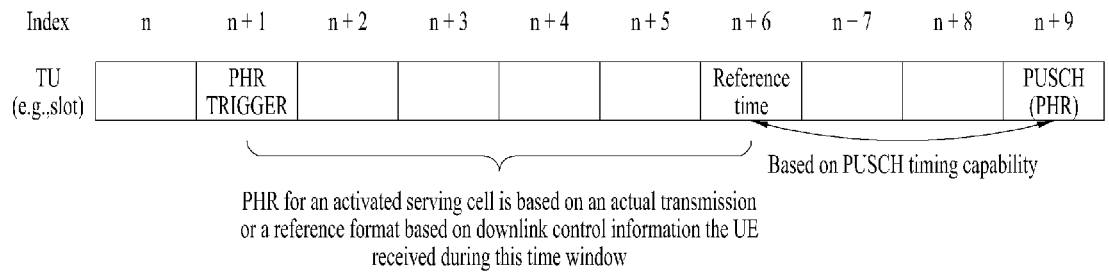
FIGS. 12 and 13 illustrate an exemplary PHR procedure according to an example of the present disclosure.

FIG. 12 illustrates a PHR procedure according to an example of the present disclosure. The UE may determine/report a PH based on an actual transmission for an (other) cell with UL transmission/scheduling in a PHR PUSCH transmission occasion, and determine/report a PH based on a reference format for a cell without the UL transmission/scheduling. UL transmission/scheduling may include semi-persistent/periodic transmission/scheduling based on higher-layer (e.g., RRC) signaling (hereinafter, referred to semi-static scheduling) and dynamic scheduling based on DCI. In semi-static scheduling, for example, the UE may determine whether there is UL transmission/scheduling in a PHR PUSCH transmission occasion based on CG configuration information (e.g., PUSCH allocation information) for a corresponding cell, received from the BS in advance (e.g., RRC connection process/before PHR triggering), and/or periodic/semi-persistent SRS configuration information for the corresponding cell.

Further, in dynamic scheduling, it may be determined whether there is UL transmission/scheduling in a PHR PUSCH transmission occasion based on scheduling information (e.g., DCI) received within a PHR window. For example, referring to FIG. 12, the UE may determine/report a PH based on an actual transmission or a reference format according to DCI which has been received (1) from a time when a PHR is triggered, or (2) on or before a time earlier than a time when the UE transmits a PUSCH to report a PH (i.e., a PUSCH transmission occasion) by a time interval corresponding to the PUSCH timing capability of the UE. Specifically, based on the received DCI, the PH may be determined/reported based on an actual transmission for a cell with UL transmission/scheduling such as a scheduled PUSCH, PUCCH, or SRS scheduled (in a PHR PUSCH transmission occasion) and based on a reference format for a cell without the UL transmission/scheduling. For example, the PH may be determined/reported based on the actual transmission or the reference format in consideration of PUSCH scheduling/transmission for a Type 1 PH, in consideration of PUSCH/PUCCH scheduling/transmission for a Type 2 PH, and in consideration of SRS transmission/scheduling for a Type 3 PH.

Accordingly, when the PUSCH to carry the PHR is based on a CG, the PHR window may be understood as [PHR triggering time, PHR PUSCH transmission (starting) time—PUSCH timing capability-based time interval]. [A, B] represents the closed interval of A to B. For example, in FIG. 12, the PHR window may be defined as [slot #(n+1), PUSCH transmission occasion of slot #(n+9)—PUSCH timing capability-based time interval].

The PUSCH timing capability-based time interval may be defined using a conventional PUSCH processing time, as follows $$T'_{proc,2} = \max((N_2 + d_{2,1})(2048+144)*k*2^{-u}*T_c, d_{2,2}) \quad \text{[Equation 4]}$$

For each parameter, the definition of Equation 1 may be referred to. Due to the CG-based PUSCH, however, $d_{2,1}$ may be fixed to 0 or 1, and it may be defined that $d_{2,2}=0$.

In Equation 1, μ is defined as follows: "μ is one of (μDL, μUL), which maximizes $T_{proc,2}$. μDL is the SCS of a DL BWP in which DCI scheduling a PUSCH is transmitted, and μUL is the SCS of a UL BWP in which the PUSCH is to be transmitted".

Therefore, even though the type of a PH to be reported (i.e., actual transmission-based PH/reference format-based PH) is determined based on the UE PUSCH timing capability, there is still ambiguity about how to determine a DL SCS, μDL by which the UE PUSCH timing capability is determined. Particularly in the NR system, a plurality of DL BWPs may be configured in each cell (or carrier), and DL SCSs may be different for the respective DL BWPs. Therefore, not only ambiguity about a cell but also ambiguity about a BWP is involved in determining the DL SCS. Accordingly, the following methods are additionally proposed to determine a DL SCS reference for determining an actual/reference format PH transmitted on a CG PUSCH in the present disclosure.

Method 1) the SCS of a DL BWP Having the Lowest (or Highest) BWP Index Among DL BWPs Configured for a Specific Cell is Used as a Reference.

Simply, a μDL value (see Equation 4) used in determining a UE PUSCH timing capability may be determined as the SCS of a BWP with a lowest index (e.g., index 0) or a highest index configured for a specific cell of the UE in order to avoid a PHR format mismatch between the BS and the UE.

Method 2) the Smallest (or Largest) of the SCSs of DL BWPs Configured for a Specific Cell is Used as a Reference.

To aggressively reflect more of DCI scheduling until a PH reporting time, the largest of the SCSs of DL BWPs configured for a specific cell may be determined as a μDL value for use in determining a UE PUSCH timing capability (see Equation 4). On the contrary, the smallest of the SCSs of the DL BWPs configured for the specific cell may be determined as the μDL value for use in determining the UE PUSCH timing capability (see Equation 4) in order to reduce the processing load of the UE.

Method 3) the Smallest (or Largest) SCS within a UE Capability is Used as a Reference.

To aggressively reflect more of DCI scheduling until a PH reporting time, a largest SCS within a UE capability may be determined as a μDL value for use in determining a UE PUSCH timing capability (see Equation 4). On the contrary, a smallest SCS within the UE capability may be determined as the μDL value for use in determining the UE PUSCH timing capability (see Equation 4) in order to reduce the processing load of the UE.

Method 4) the SCS of the Firstly (or Latest) Activated BWP for a UE Among DL BWPs Configured for a Specific Cell is Used as a Reference.

Simply, a μDL value (see Equation 4) used in determining a UE PUSCH timing capability may be determined as the SCS of a firstly (or latest) activated BWP among BWPs configured for a specific cell of the UE in order to avoid a PHR format mismatch between the BS and the UE. The latest activated BWP means an active BWP. Particularly, when the active BWP is applied, only transmissions scheduled before an actual processing time from a PUSCH transmission including a PHR are reflected in the PHR in direct consideration of a processing time allowed to prepare a PUSCH transmission including the PHR, thereby facilitating UE implementation.

Method 5) the SCS of a DL BWP Carrying an RRC Message that Configures a CG PUSCH or the SCS of a DL BWP Carrying DCI Indicating Activation of an RRC-Configured CG PUSCH Among DL BWPs Configured for a Specific Cell is Used as a Reference.

Similarly to a conventional method in which a μDL value for transmission of DCI is applied as a μDL value for a PUSCH scheduled by the DCI, the SCS of a BWP carrying an RRC message configuring a CG PUSCH on which a PH will be transmitted or the SCS of a DL BWP carrying DCI indicating activation of an RRC-configured CG PUSCH among DL BWPs configured for a specific cell is used as a reference.

Method 6) it is Assumed that a DL SCS is Equal to the SCS of a CG PUSCH.

Simply, it may be assumed that a μDL value used in determining a UE PUSCH timing capability is equal to the SCS of a CG PUSCH to carry a PH irrespective of the SCS of an actual DL BWP, to avoid a PHR format mismatch between the BS and the UE.

In Method 1 to Method 6, a specific cell may be preferably determined to be a scheduling cell configured to schedule a cell/BWP configured with a CG PUSCH, or a P(S)Cell. Alternatively, the specific cell may be determined to be a cell identical to a UL cell carrying the CG PUSCH or a DL cell paired with the UL cell. More preferably, the specific cell may be determined to be a scheduling cell configured to schedule a cell/BWP configured with the CG PUSCH. When the specific cell is determined to be the scheduling cell configured to schedule the PUSCH, only transmissions scheduled earlier than the PUSCH transmission including a PHR by an actual processing time are reflected in the PHR in direct consideration of a processing time allowed for the UE to prepare the PUSCH transmission including the PHR, thereby facilitating UE implementation. The scheduling cell for the cell/BWP configured with the CG PUSCH may be configured by SIB information (e.g., SIB-2). Further, a DL BWP refers to a (contiguous) frequency band in which the UE actually receives DCI or a PDSCH in a cell at one time point in the above methods. When the UE is configured with a plurality of DL BWPs, only one BWP may be active at one time.

Figure 13:
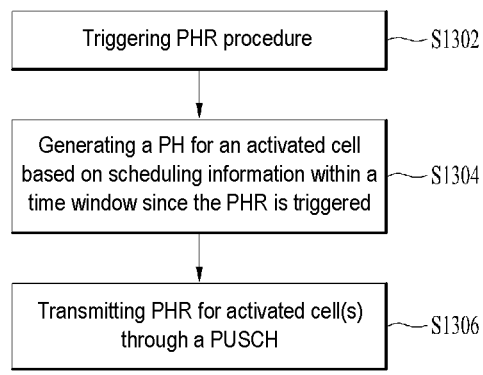

FIG. 13 illustrates an exemplary PHR procedure according to an example of the present disclosure.

Referring to FIG. 13, a UE may trigger the PHR procedure (S1302). For an event that triggers the PHR procedure, for example, refer to the description of FIG. 8. The UE may then generate a PH for each activated (serving) cell (S1304). The PH of each cell may be generated based on scheduling information within a time window (e.g., the PHR window in FIG. 12) after the PHR procedure is triggered. For example, a PH based on an actual transmission may be determined/reported in consideration of an actual scheduled PUSCH or SRS for the active (serving) cell or a PH based on a reference format on the assumption of no actual transmission may be determined/reported, based on the scheduling information within the time window. Then, the UE may transmit the PH of the active (serving) cell on a PUSCH (S1306). The PH may be transmitted in a MAC CE, and for the format of the MAC CE, the description of FIG. 9 may be referred to.

When a PUSCH carrying the PH (i.e., PHR PUSCH) is based on a CG (or SPS), the time window of step S1304 may be determined based on a PUSCH timing capability, as illustrated in FIG. 12. A DL SCS, μDL used to determine a time interval corresponding to the PUSCH timing capability (i.e., a PUSCH processing time) may be determined according to Method 1 to Method 6. On the other hand, when the PHR PUSCH is based on a dynamic UL grant (i.e., a PDCCH corresponding to the PHR PUSCH), the time window of step S1304 is determined based on the reception time of DCI (e.g., DCI format 0_0 or DCI forma 0_1) (or a PDCCH) that schedules the PHR PUSCH as illustrated in FIG. 10.

According to the proposal of the present disclosure, Table 7 may be modified to Table 8.

TABLE 8

[For PHR PUSCH is based on DCI format 0_0 or DCI format 0_1]
A UE determines whether a power headroom report for an activated serving cell is based on an actual transmission or a reference format based on scheduling information, e.g., the downlink control information the UE received until and including the PDCCH monitoring occasion where the UE detects the first DCI format 0_0 or DCI format 0_1 scheduling an initial transmission of a transport block (=UL grant DCI that schedules a PUSCH used for carrying PHR) since a power headroom report was triggered.
[For PHR PUSCH is based on CG]
A UE determines whether a power headroom report for an activated serving cell is based on an actual transmission or a reference format based on scheduling information, e.g., downlink control information the UE received until (the first symbol of) a configured PUSCH transmission minus T'proc, 2 (see, equation 4) since a power headroom report was triggered. uDL is determined based on scheme 1~6.

The scheduling information is for an activated cell for which a PH is to be reported. Further, the scheduling information may include higher-layer signaling (e.g., RRC signaling)-based semi-persistent/periodic scheduling information. For example, the scheduling information may include higher-layer signaling (e.g., RRC signaling) about CG configuration information (e.g., PUSCH allocation information) and/or periodic/semi-persistent SRS configuration information. The higher-layer signaling related to scheduling of the corresponding cell may be received preliminarily (e.g., before an RRC connection process/PHR triggering).

Various descriptions, functions, procedures, proposals, methods, and/or operational flowcharts of the present disclosure may be applied to, but not limited to, various fields requiring wireless communication/connection (e.g., 5G) between devices.

With reference to the drawings, the present disclosure will be described in greater detail. Unless otherwise specified, like reference numerals may denote the same or corresponding hardware blocks, software blocks, or functional blocks.

Figure 14:
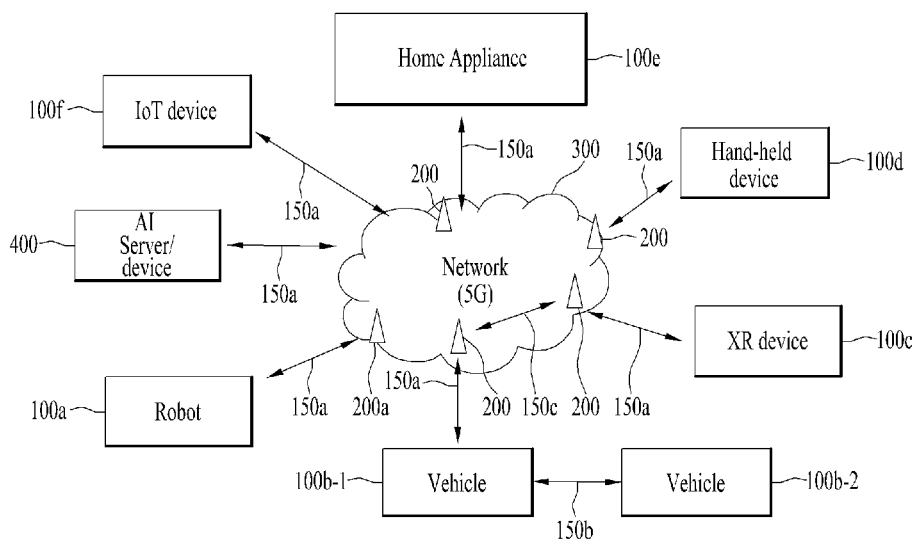
FIGS. 14 to 17 illustrate a communication system 1 and wireless devices applied to the present disclosure.

FIG. 14 illustrates a communication system 1 applied to the present disclosure.

Referring to FIG. 14, a communication system 1 applied to the present disclosure includes wireless devices, BSs, and a network. Herein, the wireless devices represent devices performing communication using RAT (e.g., 5G New RAT (NR)) or LTE) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
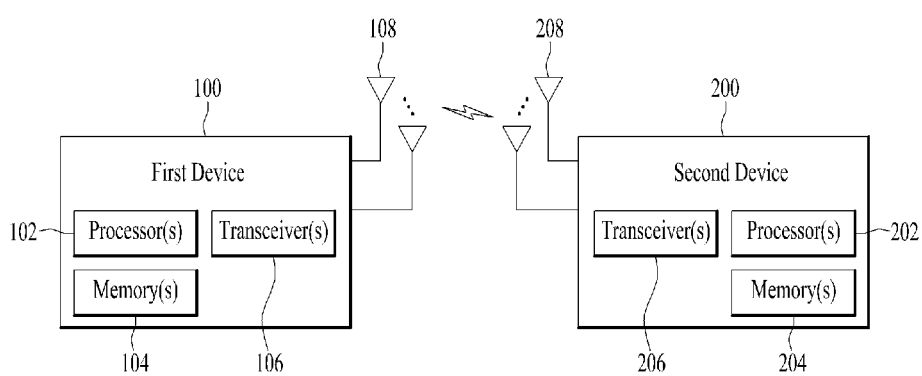

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
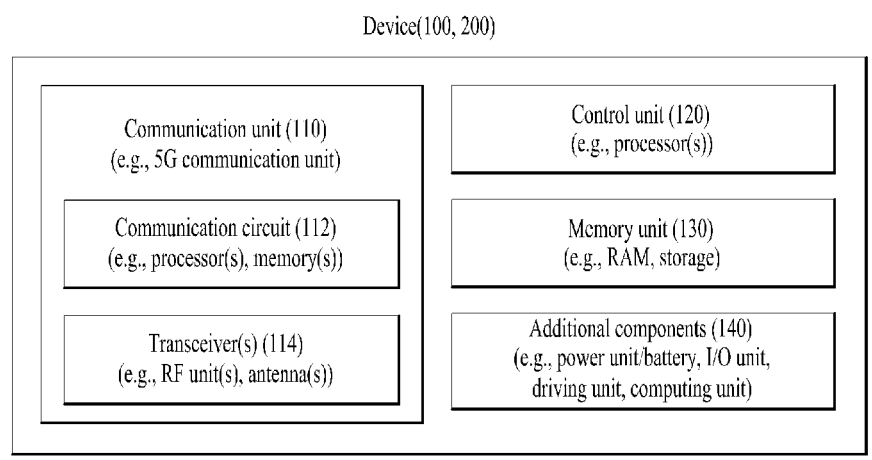

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 17:
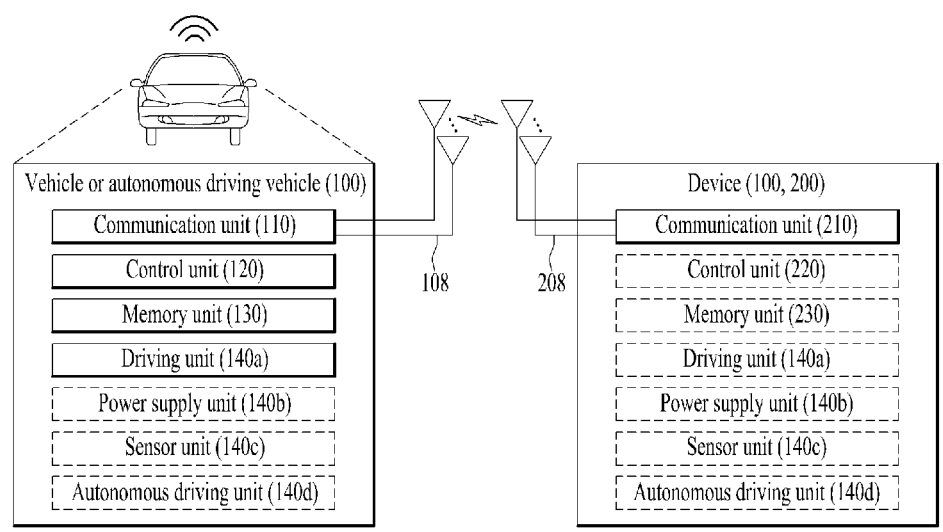

FIG. 17 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an electronic control unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, eNBs or other apparatuses of a wireless mobile communication system.

What is claimed is:

1. A method of transmitting a signal by an apparatus in a wireless communication system, the method comprising:
    triggering a power headroom report (PHR) at a first time point;
    determining power headroom (PH) information about a cell based on an actual transmission or a reference format based on an uplink (UL) scheduling state; and
    transmitting the PH information about the cell on a configured grant (CG)-based physical uplink shared channel (PUSCH) at a second time point,
    wherein the UL scheduling state includes reception of downlink control information from the first time point to a third time point before the second time point, and a time interval between the third time point and the second time point is determined based on a PUSCH preparation time,
    wherein the PUSCH preparation time satisfies $A*2^{-u}$ where A is a positive number based on a PUSCH timing capability and u is one of (uDL, uUL), which maximizes the PUSCH preparation time, and
    wherein uDL is related to a subcarrier spacing (SCS) of an active downlink (DL) bandwidth part (BWP) of a scheduling cell for the CG-based PUSCH, uUL is related to an SCS applied to the CG-based PUSCH, and the SCSs satisfy $15*2^u$ KHz.

2. The method according to claim 1, wherein $A*2^{-u}$ satisfies $(N_2+d_{2,1})(2048+144)*k*2^{-u}*Tc$, $N_2$ represents the number of symbols based on the PUSCH timing capability, $d_{2,1}$ is 0 or 1, k is 64, and Tc is $1/(480*10^3*4096)$.

3. The method according to claim 1, wherein the cell is an activated cell.

4. The method according to claim 1, wherein the cell is different from a cell in which the CG-based PUSCH is transmitted.

5. The method according to claim 1, wherein the UL scheduling state further includes a sound reference signal (SRS) scheduling state.

6. An apparatus configured to operate in a wireless communication system, the apparatus comprising:
    a memory; and
    a processor,
    wherein the processor is configured to perform operations comprising:
        triggering a power headroom report (PHR) at a first time point,
        determining power headroom (PH) information about a cell based on an actual transmission or a reference format based on an uplink (UL) scheduling state, and
        transmitting the PH information about the cell on a configured grant (CG)-based physical uplink shared channel (PUSCH) at a second time point,
    wherein the UL scheduling state includes reception of downlink control information from the first time point to a third time point before the second time point, and a time interval between the third time point and the second time point is determined based on a PUSCH preparation time,
    wherein the PUSCH preparation time satisfies $A*2^{-u}$ where A is a positive number based on a PUSCH timing capability and u is one of (uDL, uUL), which maximizes the PUSCH preparation time, and
    wherein uDL is related to a subcarrier spacing (SCS) of an active downlink (DL) bandwidth part (BWP) of a scheduling cell for the CG-based PUSCH, uUL is related to an SCS applied to the CG-based PUSCH, and the SCSs satisfy $15*2^u$ KHz.

7. The apparatus according to claim 6, wherein $A*2^{-u}$ satisfies $(N_2+d_{2,1})(2048+144)*k*2^{-u}*Tc$, $N_2$ represents the number of symbols based on the PUSCH timing capability, $d_{2,1}$ is 0 or 1, k is 64, and Tc is $1/(480*10^3*4096)$.

8. The apparatus according to claim 6, wherein the cell is an activated cell.

9. The apparatus according to claim 6, wherein the cell is different from a cell in which the CG-based PUSCH is transmitted.

10. The apparatus according to claim 6, wherein the UL scheduling state further includes a sound reference signal (SRS) scheduling state.

11. The apparatus according to claim 6, wherein the apparatus includes an autonomous driving vehicle communicable with at least a user equipment (UE), a network, and another autonomous driving vehicle other than the apparatus.

* * * * *